United States Patent
Inagaki (10) Patent No.: US 10,175,097 B2
(45) Date of Patent: Jan. 8, 2019

(54) MEASUREMENT SYSTEM AND MEASUREMENT UNIT

(71) Applicant: KYOCERA CORPORATION, Kyoto (JP)

(72) Inventor: Tomohiro Inagaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 167 days.

(21) Appl. No.: 15/107,508

(22) PCT Filed: Dec. 8, 2014

(86) PCT No.: PCT/JP2014/006121
§ 371 (c)(1),
(2) Date: Jun. 23, 2016

(87) PCT Pub. No.: WO2015/098009
PCT Pub. Date: Jul. 2, 2015

(65) Prior Publication Data
US 2016/0320233 A1    Nov. 3, 2016

(30) Foreign Application Priority Data
Dec. 26, 2013   (JP) ................ 2013-270041

(51) Int. Cl.
*G01H 17/00*    (2006.01)
*H04M 1/24*    (2006.01)
(Continued)

(52) U.S. Cl.
CPC .............. *G01H 17/00* (2013.01); *H04M 1/24* (2013.01); *H04R 5/027* (2013.01); *H04R 29/001* (2013.01);
(Continued)

(58) Field of Classification Search
CPC ...................................................... G01H 17/00
(Continued)

(56) References Cited

U.S. PATENT DOCUMENTS 5,624,377 A    4/1997   Davis
9,618,385 B2*  4/2017   Inagaki ................. G01H 1/04
(Continued)

FOREIGN PATENT DOCUMENTS

JP    58-198338 A    11/1983
JP    03-168000 A    7/1991
(Continued)

OTHER PUBLICATIONS

International Search Report from corresponding PCT/JP2014/006121 dated Mar. 10, 2015, 4 pp.
(Continued)

*Primary Examiner* — Son Le
*Assistant Examiner* — Tarun Sinha
(74) *Attorney, Agent, or Firm* — Studebaker & Brackett PC (57) ABSTRACT

Provided is a measurement system for evaluating an electronic apparatus that, when a vibrator of the electronic apparatus is pressed against the human ear, delivers a sound generated by vibration of the vibrator. The measurement system includes: an ear-shaped unit composed of an ear model simulating the human ear and an artificial ear canal portion constituting an artificial ear canal extending from the ear model; an artificial mandible portion disposed next to the artificial ear canal portion in the ear-shaped unit in a planar view; and a vibration detection unit that is disposed on a plane of the artificial mandible opposite to the ear model and detects and outputs vibration delivered to the artificial mandible portion.

20 Claims, 6 Drawing Sheets

(51) Int. Cl.
     *H04R 29/00*     (2006.01)
     *H04R 5/027*     (2006.01)
(52) U.S. Cl.
     CPC ...... *H04R 2460/13* (2013.01); *H04R 2499/11* (2013.01)
(58) Field of Classification Search
     USPC .......................................................... 73/647
     See application file for complete search history.

(56) References Cited

U.S. PATENT DOCUMENTS

| | | | | |
|---|---|---|---|---|
| 9,800,974 | B2 * | 10/2017 | Ikeda ................... | H04R 5/027 |
| 2017/0325040 | A1 * | 11/2017 | Ikeda ................... | H04R 5/027 |

FOREIGN PATENT DOCUMENTS

| | | | |
|---|---|---|---|
| JP | 06-38359 U | 5/1994 | |
| JP | 11-500284 A | 1/1999 | |
| JP | 2005-348193 A | 12/2005 | |

OTHER PUBLICATIONS

Written Opinion from corresponding PCT/JP2014/006121 dated Mar. 10, 2015, with concise explanation, 55 pp.

* cited by examiner

MEASUREMENT SYSTEM AND MEASUREMENT UNIT

CROSS REFERENCE TO RELATED APPLICATION

This application claims priority to and the benefit of Japanese Patent Application No. 2013-270041 filed on Dec. 26, 2013, the entire contents of which are incorporated herein by reference.

TECHNICAL FIELD

The present invention relates to a measurement system and a measurement method for evaluating an electronic apparatus that delivers a sound based on vibration of a vibrator to a user.

BACKGROUND ART

PLT 1 set forth below describes an electronic apparatus such as a mobile phone that delivers an air conduction sound and a bone conduction sound to a user. The PLT 1 also describes that the air conduction sound is a sound transmitted to the auditory nerve of the user when vibrating air generated by vibration of an object is transmitted to the eardrum via the ear canal and vibrates the ear dram. The PLT 1 further describes that the bone conduction sound is a sound transmitted to the auditory nerve of the user via a part of the body of the user (for example, the cartilage of the ear) who is in contact with an vibrating object.

The PLT 1 describes that, in a telephone, a vibrator in the shape of a short rectangular plate made with a piezoelectric bimorph and a flexible material is attached to an outer surface of a housing of the telephone via an elastic member. The PLT 1 also describes that, upon application of a voltage to the piezoelectric bimorph of the vibrator, a piezoelectric material stretches and contracts in a longitudinal direction causing vibration of the vibrator and, when the user brings the vibrator into contact with the auricle, the air conduction sound and the bone conduction sound are delivered to the user.

CITATION LIST

Patent Literature

PLT 1: JP2005-348193 (A)

SUMMARY

Technical Problem

Incidentally, we have developed a mobile phone that, unlike the telephone described in the PLT 1 set forth above, delivers a sound by using the air conduction sound generated by vibration of a panel such as a display panel and a protection panel disposed on a surface of the mobile phone and the vibration sound as a sound component of the vibration delivered when the vibrating panel is pressed against the human ear. Then, we conceived that, in order to appropriately evaluate the electronic apparatus that delivers some sound based on the vibration of the telephone of the PLT 1 and the mobile phone we have been developing, it is preferred to measure, by simulating the human body as close to the human body as possible, delivery of an effective sound pressure as a composite of a sound pressure and a vibration amount to the human body by the vibration of the vibrator. Conventionally, however, no measurement method has been suggested that is capable of measuring the sound pressure and the vibration amount delivered to the human body by the vibration of the vibrator, i.e., the effective sound pressure as the composite of the air conduction sound and the bone conduction sound. Generally, two measurement methods described below are known as vibration amount measuring methods. One of the measuring methods is a method of measuring the vibration amount as the voltage by pressing a vibrator of a measuring object against the artificial mastoid for measurement of a bone conduction vibrator mechanically simulating the mastoid portion behind the ear. The other measuring method is a method of measuring the vibration amount as the voltage by pressing vibration pickup such as a piezoelectric accelerometer pickup and the like against the vibrator of the measuring object.

However, the voltage measured by the former measuring method described above is not weighted by vibration transmission characteristics presented when the vibrator is pressed against the human ear but is mechanically weighted by human body characteristics presented when the vibrator is pressed against the mastoid portion behind the human ear. Also, the voltage measured by the latter measuring method is obtained by direct measurement of the vibration amount of the vibrator by using a vibrating object and, as with the former measuring method, is not weighted by the vibration transmission characteristics to the human body. Therefore, measurements of the vibration amount of the vibrator by employing the conventional measuring methods lead to an inaccurate evaluation of the vibration amount delivered to the human body by the electronic apparatus.

In view of the above problems, it could be helpful to provide a measurement system and a measurement method that are capable of measuring, by simulating the human body, the effective sound pressure as the composite of the vibration amount and the sound pressure that are delivered to the human body by the vibration of the vibrator.

Solution to Problem

A measurement system of the disclosure herein is a measurement system for evaluating an electronic apparatus that, when a vibrator is pressed against the human ear, delivers a sound generated by vibration of the vibrator to a user, the measurement system includes: an ear-shaped unit composed of an ear model simulating the human ear and an artificial ear canal portion constituting an artificial ear canal extending from the ear model; an artificial mandible portion arranged next to the artificial ear canal portion in the ear-shaped unit in a planar view; and a vibration detection unit disposed on a plane of the artificial mandible portion opposite to the ear model, the vibration detection unit for detecting and outputting vibration delivered to the artificial mandible portion.

Advantageous Effect

According to the disclosure herein, a measurement system and a measurement method that are capable of measuring, by simulating the human body, the effective sound pressure as a composite of a vibration amount and a sound pressure that are delivered to the human body by vibration of the vibrator may be provided.

DETAILED DESCRIPTION

Hereinafter, embodiments of the disclosure herein will be described with reference to the accompanying drawings.

First Embodiment

Figure 1:
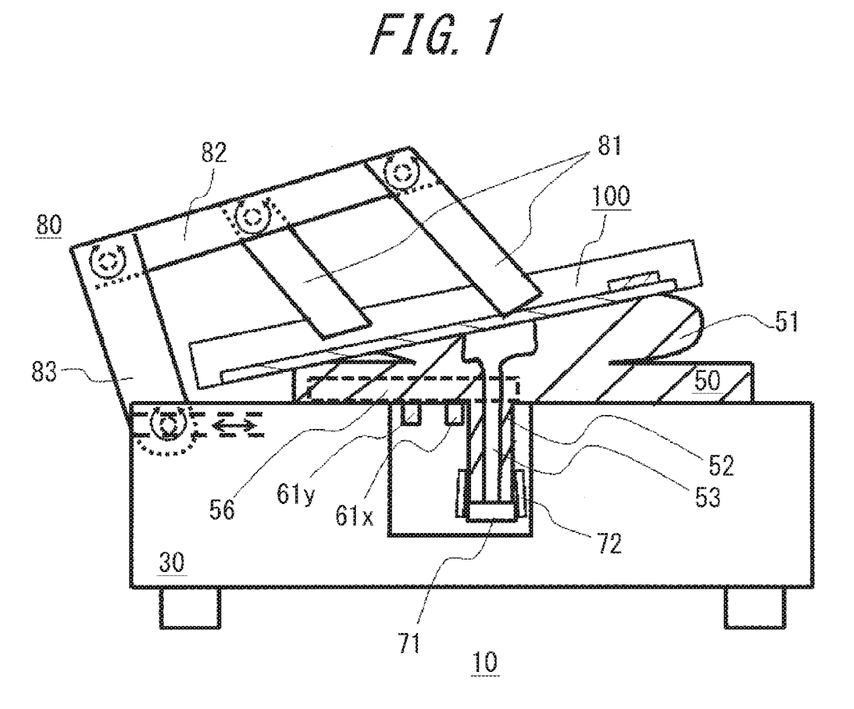
FIG. 1 is a diagram illustrating a schematic configuration of a measurement system according to a first embodiment of the disclosure herein.
Figure 2:
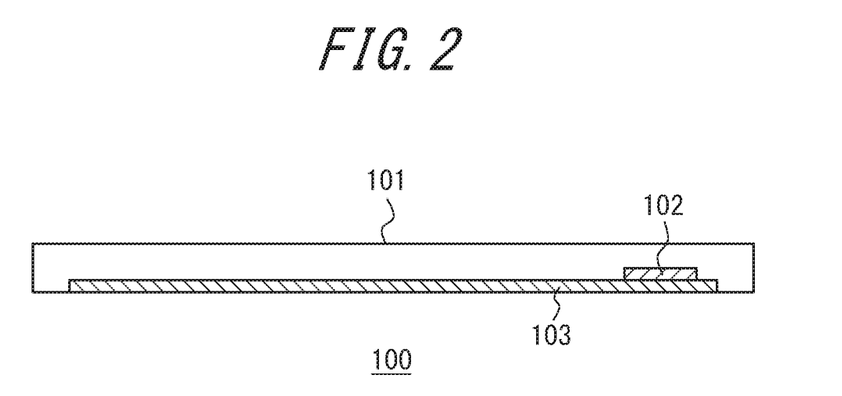
FIG. 2 is a planar view illustrating an example of an electronic apparatus of a measuring object.

FIG. 1 is a diagram illustrating a schematic configuration of a measurement system according to a first embodiment. A measurement system 10 according to the present embodiment includes a base 30, an ear-shaped unit 50, measurement systems 60 and 70, and the like. In the following description, an electronic apparatus 100, as illustrated in a cross-sectional view of FIG. 2, is a mobile phone such as, for example, a smartphone having a panel 103 rectangular in shape larger than the human ear on a surface of a housing 101 in the shape of a rectangle. The panel 103 vibrates serving as a vibrator.

The base 30 may include a metal base made of SUS or the like and legs provided with a base isolation member made with a rubber material. Thereby, vibration from a desk or the like having the base 30 placed thereon is not likely to adversely affect measurement.

The ear-shaped unit 50 simulates the human ear and includes an ear model 51 corresponding to the auricle of the human, and an artificial ear canal portion 52 coupled to the ear model 51. The artificial ear canal portion 52 is in size covering the ear model 51 and has an artificial ear canal 53 formed in a center thereof. The ear-shaped unit 50 is supported by the base 30 in a periphery of the artificial ear canal portion 52.

The ear-shaped unit 50 (the ear model 51 and the artificial ear canal portion 52) is made from a material similar to a material of common ear models (KB0060 to KB 1091) and the like that are used for, for example, human body model HATS (Head And Torso Simulator) and KEMAR (registered trademark, an electronic mannequin manufactured by Knowles Electronics, LLC. used for acoustic research). The material conforms to, for example, IEC60318-7. This material may be, for example, rubber with hardness 35 to 55. The hardness of rubber is preferably measured in conformity with international rubber hardness (IRHD, M-method) in accordance with, for example, JIS K 6253 or ISO 48. As a hardness measurement system, international rubber hardness measurer GS680 manufactured by Teclock Corporation, which is micro-sized and employs a fully automatic IRHD method, is preferably used. Note that, preferably, in consideration of variations of hardness of the ear due to age differences, the ear-shaped units 50 of roughly 2 or 3 types with different hardness are prepared and used by turns.

A length of the artificial ear canal 53 composed of the artificial ear canal portion 52 corresponds to a length to the eardrum and appropriately set within a range of, for example, 26 mm and 40 mm. According to the present embodiment, the length of the artificial ear canal 53 is approximately 30 mm.

Figure 3:
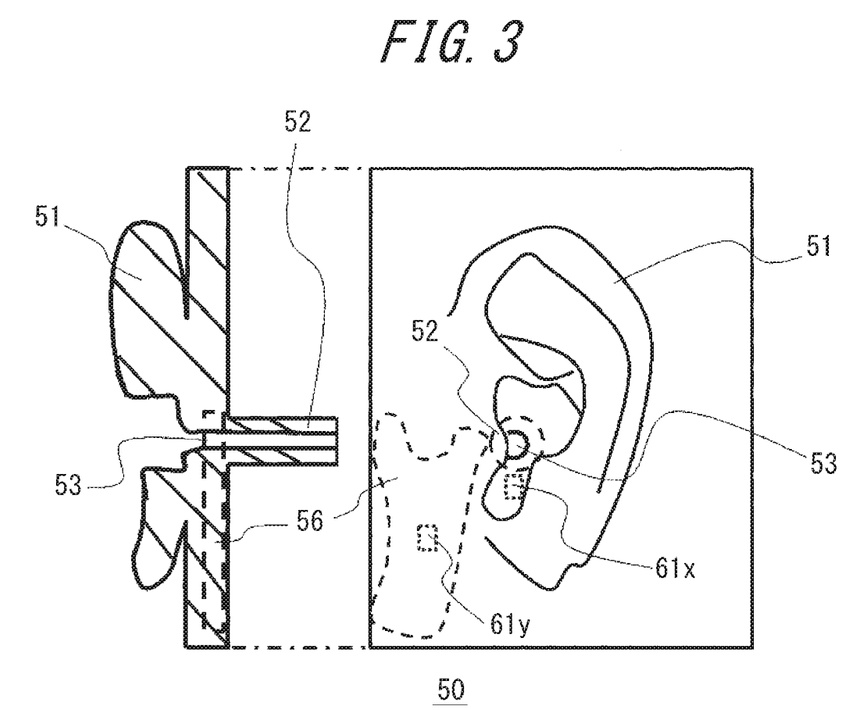
FIG. 3 is a partial detailed view of an ear-shaped unit of FIG. 1.
Figure 4:
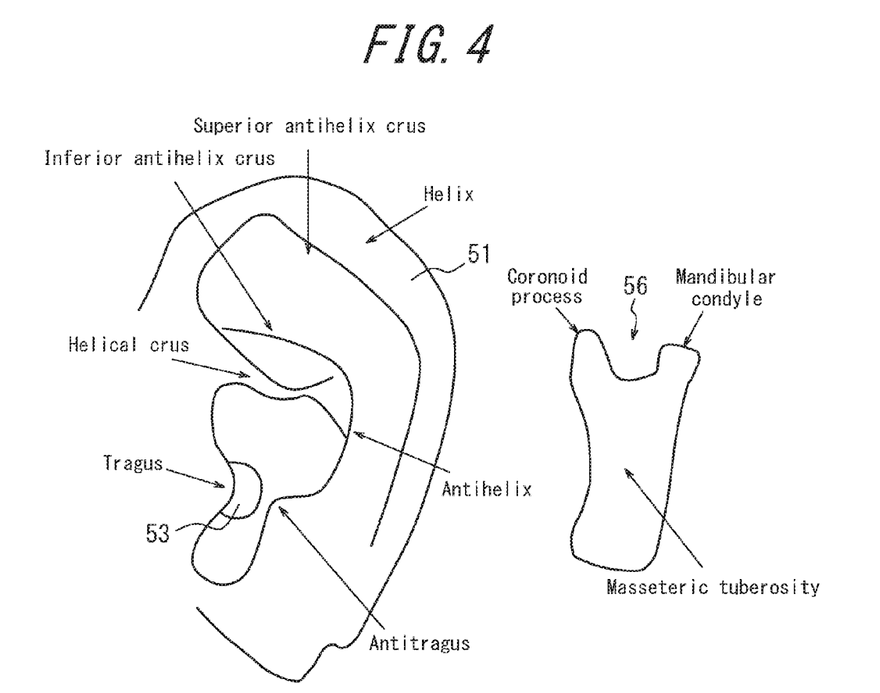
FIG. 4 is a diagram illustrating names of parts of the ear-shaped unit of FIG. 1.

As illustrated in FIG. 3, the ear-shaped unit 50 is provided with an artificial mandible portion 56 at a position opposite to the ear model 51 and adjacent to the artificial ear canal portion 52 in a manner not overlapping therewith. The artificial mandible portion 56 has a plate-like shape and, as illustrated in FIG. 4, may include the masseteric tuberosity, a muscle projection, and the mandibular condyle so as to simulate the human body. Or, the artificial mandible portion 56 may be formed by a simplified rectangular plate in consideration of cost. Here, the artificial mandible portion 56 simulates an upper half of the mandible alone, omitting a lower half of the mandible (the chin, teeth, etc.).

When the panel 103 for vibrating is in size covering the ear as illustrated in FIG. 2, a portion of the panel comes into contact with the auricle while other portion of the panel abuts the mandible via the skin. Therefore, generation of a vibration component (a bone conduction component) from the panel 103 via the mandible is expected. Also, when earphones or the like that are inserted in the ear canal to transmit a sound by the vibration are in use, the bone conduction component delivered from inside the ear canal to the mandibular condyle may be generated. However, since the mandibular condyle of the artificial mandible portion 56 locates close to the artificial ear canal portion 52, the bone conduction component as described above may be simulated.

The artificial mandible portion 56 may be made of a metallic material such as SUS and aluminum, or a hard resin material such as polycarbonate resin and acrylic resin.

Or, the artificial mandible portion 56 may be made of a biological material such as hydroxyapatite. With such a material, vibration characteristics is expected to be similar to that of the human bone, allowing a reduction in calibration of the measurement.

A thickness of the artificial mandible portion 56 depends on the material thereof. For example, the artificial mandible portion 56 made of the metallic material described above may have a thickness of approximately 0.1 mm to 2 mm, and the artificial mandible portion 56 made of the hard resin material may have a thickness of approximately 2 mm to 5 mm The artificial mandible portion 56 has, for example, a vertical width of approximately 2.0 cm to 5 cm and a horizontal width of approximately 1.0 cm to 3 cm.

As illustrated in FIGS. 1 and 3, on a plane opposite to the ear model 51 of the ear-shaped unit 50 and at a position in the periphery of the artificial ear canal portion 52 in a planar view where the antiracial mandible portion is not located, a vibration detection element 61x of a vibration detection unit 60 is arranged. The vibration detection element 61x, when the panel 103 being vibrating is pressed against the ear-shaped unit 50, detects an amount of vibration delivered primarily through the soft tissues such as the ear model 51 and the artificial ear canal portion 52. That is, the vibration detection element 61x detects a vibration component of the vibration of the panel 103 that directly vibrates the inner ear without passing through the eardrum.

Also, a vibration detection element 61y is disposed on a rear side of the artificial mandible portion 56 described above and measures the bone conduction component delivered through the soft tissues such as the human skin.

The vibration detection elements 61x and 61y are constituted by using, for example, a vibration detection element that has a flat output characteristic in a frequency range (for example, 0.1 kHz to 30 kHz) of the electronic apparatus 100 of a measuring object and is light-weight as well as capable of accurately measuring fine vibration. As such a vibration detection element, for example, vibration pickup such as piezoelectric accelerometer pickup which may be, for example, vibration pickup PV-08A manufactured by RION, Co., Ltd. or the like may be used.

As illustrated in FIGS. 1 and 3, further, the ear-shaped unit 50 is provided with a sound pressure measurement unit 70. The sound pressure measurement unit 70 measures a sound pressure of a sound delivered through the artificial ear canal 53. That is, the sound pressure measurement unit 70 measures, when the panel 103 is pressed against the human ear, a sound pressure corresponding to the air conduction component that is the air vibrated by the vibration of the panel 103 and directly delivered through the eardrum and a sound pressure corresponding to a second air conduction component that is a sound generated inside the ear when the inside of the ear canal is vibrated by the vibration of the panel 103 and delivered through the eardrum.

The sound pressure measurement unit 70 includes a microphone 71 held by a tube member 72 extending from an outer wall (a wall in the periphery of the hole) of the artificial ear canal 53. The microphone 71 is constituted by using, for example, a measuring condenser microphone having the flat output characteristic in a frequency range of the electronic apparatus 100 of the measuring object and a low self-noise level. As the microphone 71, for example, condenser microphone UC-53A manufactured by RION, Co., Ltd. or the like may be used. The microphone 71 is arranged in such a manner that a sound pressure detection plane substantially coincides with an end face of the artificial ear canal portion 52. That is, the microphone 71 is arranged at the same position as the eardrum. Note that the microphone 71 may be constituted by using, for example, a probe microphone supported on the base 30 and arranged in a manner floating from the outer wall of the artificial ear canal 53.

Next, a holder unit 80 will be described. In a case where the electronic apparatus 100 is the mobile phone such as the smartphone having the rectangular shape in a planar view, when a person tries to hold the mobile phone in one hand and press the mobile phone against the ear, both side planes of the mobile phone are usually supported. Also, pressing force and a contact state of the mobile phone to the ear vary from person to person (between users) or change during use. In the present embodiment, the electronic apparatus 100 is held in a manner simulating such use modes of the mobile phone.

Therefore, the holder unit 80 includes a support portion 81 for supporting both side planes of the electronic apparatus 100. The support portion 81 is attached to an arm 82 in such a manner that rotation thereof about an axis may be adjusted. The other end portion of the arm 82 is attached to a movement adjustment portion 83 in such a manner that rotation thereof may be adjusted. The movement adjustment portion 83 is attached to the base 30 in such a manner as to be able to move parallel to the base 30 and also in such a manner that rotation thereof may be adjusted. Also, the axis for rotatably holding each portion may be fastened or loosed repeatedly by using a screw or the like in order to obtain predetermined holding force.

Thereby, the pressing force of the electronic apparatus 100 supported by the support portion 81 applied to the ear-shaped unit 50 of the vibrator (the panel 103) is adjusted. In the present embodiment, the pressing force is adjusted within a range of 0 N to 10 N, preferably a range of 3 N to 8 N.

Here, the range of 0 N to 10 N is set intending to allow the measurement in a range sufficiently wider than the pressing force expected when a person presses the electronic apparatus against the ear for a telephone call or the like. With the pressing force of 0 N, for example, the measurement may be conducted by bringing the electronic apparatus into contact with the ear-shaped unit 50 without pressing the electronic apparatus against the ear-shaped unit 50, and also conducted each time the electronic apparatus is moved away from the ear-shaped unit 50 by 1 cm increment. Thereby, an attenuation degree based on a distance of the air conduction sound may be measured by the microphone 71, improving the convenience of the measurement system. Also, the range of 3 N to 8 N assumes a range of average force applied by a non-hearing-impaired person holding the electronic apparatus for the telephone call by using a conventional speaker. Even though there may be a difference by races and genders, what is preferable is to be able to measure, by using the electronic apparatus such as the smartphone having the conventional speaker mounted therein or a conventional mobile phone, the vibration sound and the air conduction sound with the pressing force normally applied by the user. Note that the vibrator is not limited to a panel widely covering the ear; an electronic apparatus having a protrusion or a corner portion for delivering the vibration to a portion of the ear-shaped unit 50 such as, for example, the tragus alone may also be a measuring target of the disclosure herein.

Figure 5:
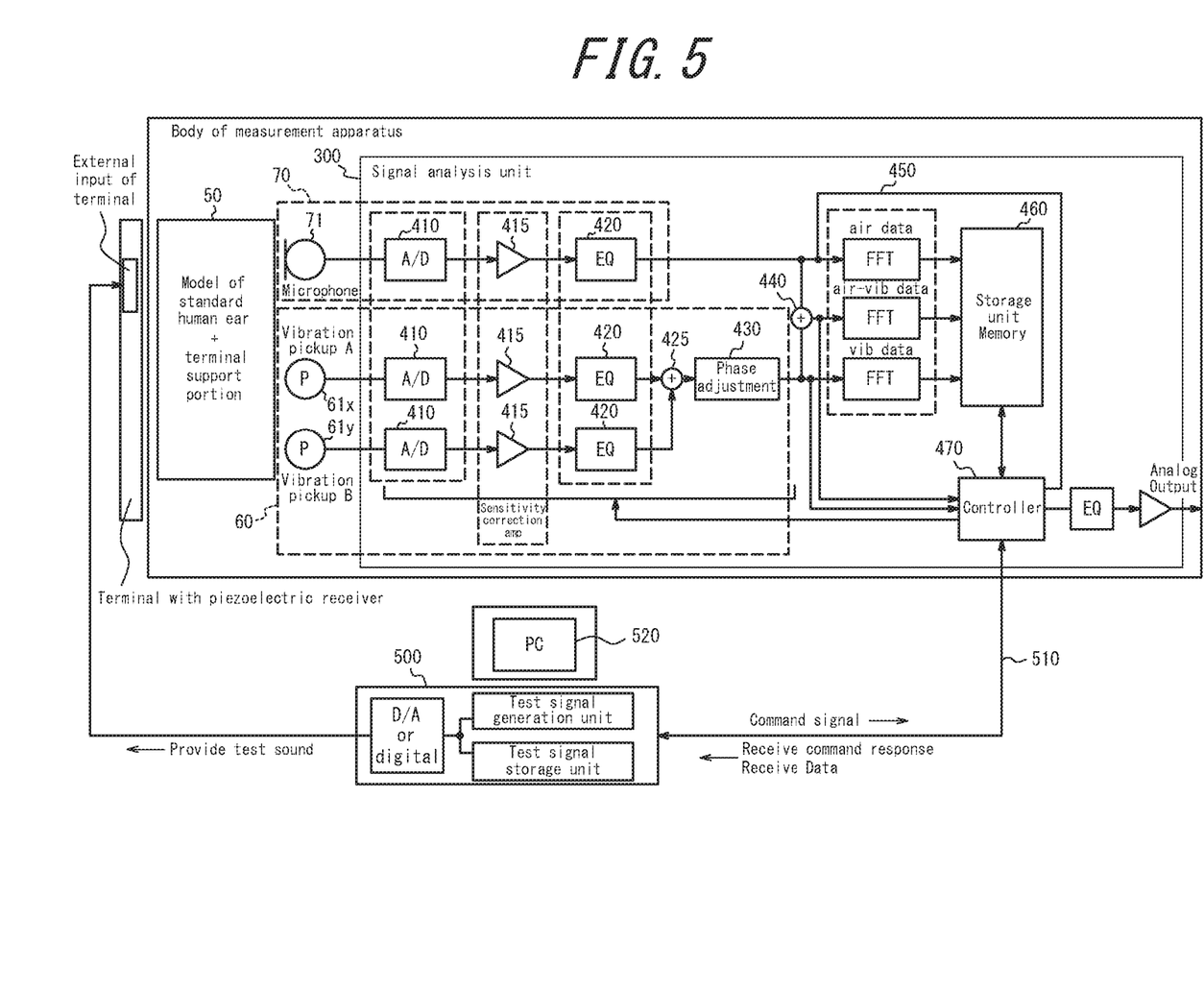
FIG. 5 is a functional block diagram illustrating a configuration of a main section of the measurement system of FIG. 1.

Next, a configuration of the signal analysis unit 300 will be described. FIG. 5 is a functional block diagram illustrating a conceptual configuration of the signal analysis unit 300 and elements associated therewith. The present embodiment measures two vibration amounts delivered by the vibration of the electronic apparatus 100 of the measuring object through the ear-shaped unit 50 and the sound pressure; that is, the present embodiment measures the effective sound pressure composed of any one of, any two of, or all of the vibration component delivered via the soft tissues, the bone conduction component delivered via the mandible, and the air conduction component. The signal analysis unit 300 mainly includes an A/D converter 410, a sensitivity adjustment unit 415, a frequency characteristic adjustment unit 420, an output synthesis unit 425 for obtaining a first synthetic component by combining the vibration component and the bone conduction component that are described above, the phase adjustment unit 430 capable of adjusting a phase of the synthesized vibration component (a first synthesis component) with respect to the air conduction component, an output synthesis unit 440 for obtaining the effective sound pressure of the human body (a second synthesis component) by combining the vibration component subjected to the phase adjustment (the first synthesis component) and the air conduction component, an analysis unit 450, a storage unit 460, and a controller 470. The measurement system of the disclosure herein may further include a PC (Personal Computer) (a display unit 520 and CPU), a printer, and the like.

Analog signals output from the vibration detection elements 61x and 61y and the microphone 71 are input to respective A/D converters 410. The A/D converter 410 has an A/D conversion circuit (A/D) for converting the analog signal into a digital signal. The A/D conversion circuit of the A/D converter 410 may handle, for example, 16 bits or more, i.e., 96 dB or more of dynamic range conversion. The A/D conversion circuit may be configured to be able to change the dynamic range.

The signals subjected to the A/D conversion are supplied to the respective sensitivity adjustment units 415. Then, amplitude of the signal subjected to the A/D conversion is individually adjusted to a desired amplitude in a manual or automatic manner. Thereby, errors of sensitivity of the vibration detection elements 61x and 61y and the microphone 71 are collected. Note that a variable gain amplifier circuit (a sensitivity correction amplifier) constituting the sensitivity adjustment unit 415 is configured to be able to adjust the amplitude of the signal subjected to the A/D conversion within a range of, for example, ±20 dB. An arrangement order of the A/D converter 410 and the sensitivity adjustment unit 415 may be altered.

An output of the sensitivity adjustment unit 415 is supplied to the frequency characteristic adjustment unit 420. The frequency characteristic adjustment unit 420 includes two equalizers (EQs) for respectively adjusting the frequency characteristics of the signals detected by the vibration detection elements 61x and 61y and an equalizer (EQ) for adjusting the frequency characteristic of the signal detected by the microphone 71. The sensitivity adjustment unit 415, in a manual or automatic manner, individually adjusts the frequency characteristics of the input signals to the frequency characteristics similar to that of human auditory. Note that the equalizer may be constituted by using, for example, a graphical equalizer for a plurality of bands, a low-pass filter, a high-pass filter, or the like.

Of the outputs from the frequency characteristic adjustment unit 420, outputs associated with the vibration component and the bone conduction component are input to the synthesis unit 425 and synthesized as one vibration component (the first synthetic component).

Then, the first synthetic component is supplied to the phase adjustment unit 430. The phase adjustment unit 430 includes a variable delay circuit for adjusting the phase of the signal detected by the vibration detection elements 61. Thereby, a phase adjustment may be carried out to approximate a speed of the sound transmitted through the artificial ear canal portion 52 and the artificial mandible portion 56 as a speed of airborne sound transmitted through the artificial ear canal.

Incidentally, a phase relationship between the output of the synthetic component (the first synthetic component) of the vibration detection elements 61x and 61y and the output of the microphone 71 is expected to be significantly different from the human ear especially at high frequencies. When the phase of the outputs of the vibration detection elements 61 and the phase of the microphone 71 are largely displaced as described above, during the synthesis of these outputs in the output synthesis unit 440, which will be described later, a peak and a dip of the amplitude may appear at a value different from an actual value, or a synthetic output may increase or decrease.

In the present embodiment, therefore, based on a measuring frequency range of the electronic apparatus 100 of the measuring object, the phase of the signals detected by the vibration detection elements 61 (a phase of the first synthetic component) is adjusted within a predetermined range by the variable delay circuit. For example, when the measuring frequency range of the electronic apparatus 100 is 100 Hz to 10 kHz, the variable delay circuit adjusts, within a range of approximately ±10 ms (equivalent to approximately ±100 Hz), the phase (the phase of the first synthetic component) of the signals detected by the vibration detection elements 61 by using a unit at least smaller than 0.1 ms (equivalent to approximately ±10 kHz). Although the human ear has a phase difference between the bone conduction sound and the air conduction sound, the phase adjustment by the variable delay circuit is carried out not to match the phases of the signals detected by the vibration detection elements 61 and the phase of the signal of the microphone 71 but to match the phases of the vibration detection elements 61 and the microphone 71 to the actual auditory by the ear.

Or, a phase adjustment unit may be additionally provided to adjust the phase of the vibration detection element 61x for detecting vibration transmission in the soft tissue and the phase of the vibration detection element 61y for detecting the vibration transmission in the artificial mandible portion 56. In this case, the phases of the vibration components are adjusted before synthesizing the vibration components of the vibration detection elements 61x and 61y.

The output of the phase adjustment unit 430 is supplied to the output synthesis unit 440. The output synthesis unit 440 obtains the second synthetic component by combining the signals (the first synthetic components) detected by the vibration detection elements 61 subjected to the phase adjustment by the variable delay circuit and the signal detected by the microphone 71 that has passed through the frequency characteristic adjustment unit 420. Thereby, the two vibration amount and the sound pressure transmitted by the vibration of the electronic apparatus 100 of the measuring object, i.e., the effective sound pressure as the composite of the vibration transmission of the soft tissue, the bone conduction sound, and the air conduction sound approximated as that of the human body may be obtained.

A synthetic output from the output synthesis unit 440 is input to the analysis unit 450. The analysis unit 450 includes three FFT (fast Fourier transform) units for carrying out a frequency analysis on the output from the output synthesis unit 440. The analysis unit 450 carries out fast Fourier transform processing on three components: the air conduction component alone, the synthetic component (the first synthetic component) of two vibration routes alone, and the second synthetic component as a composite of the air conduction component and the first synthetic component. Thereby, the FFT units provide power spectrum data corresponding to the first synthetic component (vib), power spectrum data corresponding to the air conduction component (air), and power spectrum data corresponding to the second synthetic component (air+vib), respectively.

To each FFT unit, an analysis point of a frequency component (power spectrum) is set according to the measuring frequency range of the electronic apparatus 100. For example, when the measuring frequency range of the electronic apparatus 100 is 100 Hz to 10 kHz, the FFT unit is set to analyze a frequency component at each point equally separating a logarithmic graph of the measuring frequency range into 100 to 200 sections.

The output of each FFT unit is stored in the storage unit 460. Preferably, the storage unit 460 has a capacity of at least triple buffer that allows storing analysis data (power spectrum data) of each FFT unit. The storage unit 460 may be configured to transmit latest data at timing of a data transmission request from the PC 500, which will be described later.

The controller 470 is connected to the PC 500 via, for example, a connection cable 510 for interface such as a USB, RS-232C, SCSI, and a PC card, or via a wireless connection line such as Wi-Fi (WiFi) and BT (Bluetooth). Then, based on a command from the PC 500, the controller 470 controls an operation of each unit of the signal analysis unit 300. The signal analysis unit 300 may be configured by using software executed by any suitable processor such as a CPU (central processing unit) or by using a DSP (digital signal processor).

The PC 500 has an evaluation application with which the measurement system 10 evaluates the electronic apparatus 100. The evaluation application includes test signal data and is downloaded via, for example, a CD-ROM, a network, or the like. Note that the test signal data include a pure tone signal, a multi-sine signal, and a pure tone sweep signal.

Then, the PC 500 displays, for example, an application panel in the display unit 520 based on the evaluation application. Also, the PC 500 sends a command to the signal analysis unit 300 based on information input via the application panel. Further, the PC 500 receives a command response and data from the controller 470, carries out predetermined processing based on the received data, and displays a measurement result in the application panel. The PC 500 may output the measurement result to the printer for printing, as necessary.

Note that the controller 470 may be mounted on, for example, the base 30 of an electronic apparatus mounting portion 20, and the analysis unit 450, the PC 500, and the printer may be placed remotely from the base 30. These items may be connected to one another via a connection cable or the like.

Second Embodiment

Figure 6:
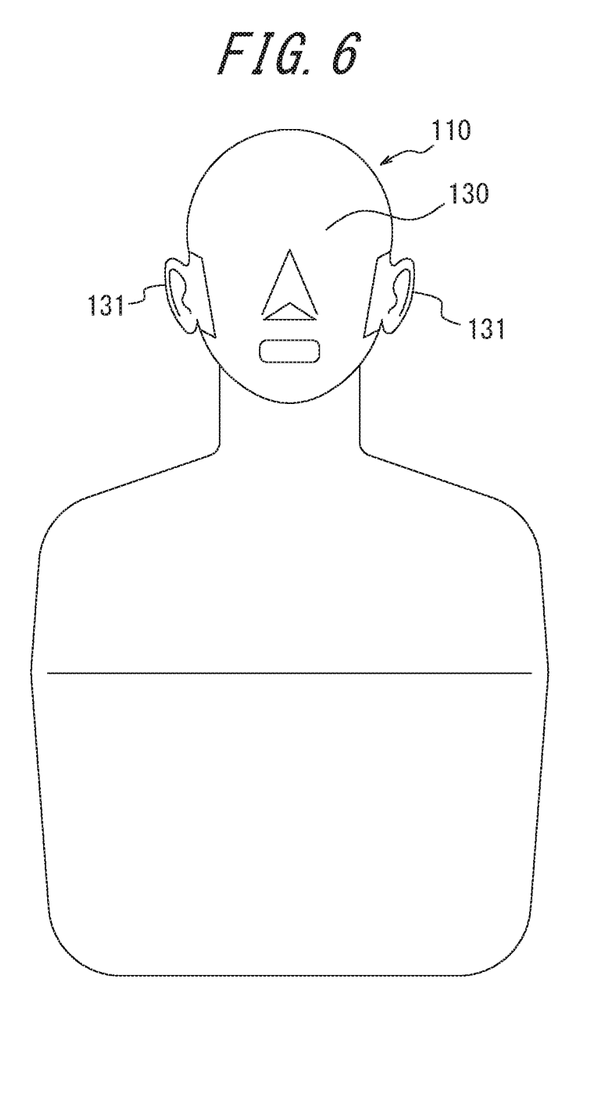
FIG. 6 is a diagram illustrating a schematic configuration of a measurement system according to a second embodiment.

FIG. 6 is a diagram illustrating a schematic configuration of a main section of a measuring system according to a second embodiment of the disclosure herein. In the second embodiment, a human head model 130 to which the ear-shaped unit 50 of the first embodiment may be attached is further provided. Other aspects of the second embodiment may be the same as the first embodiment. The human head model 130 is constituted by using, for example, HATS, KEMAR (registered trademark), or the like. An artificial ear 131 is removably attached to the human head model 130.

According to a measurement system 110 of the present embodiment, the same effect as the measurement system 10 of the first embodiment may be obtained. In the present embodiment, especially, since the human head model 130 is used, an evaluation in line with an actual use mode taking influence by the head into account may be achieved. Audio equipment and the holder unit for holding the electronic apparatus may be the same as those of the first embodiment and thus FIG. 1 may be referred to.

The disclosure herein is not limited to the above embodiments but may be modified and changed in various manners. For example, although in the above embodiments the electronic apparatus 100 of the measuring object is the smartphone having the panel 103, which is a wide panel and vibrates serving as the vibrator, an electronic apparatus such as a foldable mobile phone having a panel which comes into contact with the ear in the use mode such as the telephone call may be evaluated as well. Further, in addition to the mobile phones, various earphones claiming as employing other bone conduction schemes may also be evaluated.

In the above embodiments, further, although the phase adjustment unit 430 delays the phase of the signals detected by the vibration detection elements 61 with respect to the signal detected by the microphone 71, a buffer such as FIFO or the like may be used to advance the phase of the signal detected by the microphone 71 with respect to the signals detected by the vibration detection elements 61.

Also, although the PC 500 is provided separately from the controller 470 in the above embodiments, the controller 470 may be equipped with the function of the evaluation application executed by the PC 500, and the PC 500 may be omitted.

Further, the sensitivity adjustment unit, a signal processing unit, the A/D converter, the frequency characteristic adjustment unit, the phase adjustment unit, the output synthesis unit, the analysis unit, the storage unit, a signal processing controller, the display unit, the printer, and the like in the above embodiments need only to be capable of transmitting or receiving the signals in a wired or wireless manner. Needless to say, the measurement system of the disclosure herein may be substantialized by a stand-alone measurement apparatus collectively equipped with all functions or a measurement system that utilizes a network system or a cloud system having the sensitivity adjustment unit, the signal processing unit, the analysis unit, or the storage unit disposed in one or a plurality of PCs or in an external server.

Although the above embodiments are illustrated as representative examples, it is apparent that various modifications and substitutions may be implemented within the spirit and scope of the disclosure herein. Accordingly, the disclosure herein should not be construed as being limited to the above embodiments but, without departing from the scope of the appended claims, may be modified or changed in various manners. For example, a plurality of component blocks described in the embodiments may be combined into a single component block, or a single component block may be separated into multiple component blocks. Note that in the embodiments the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described herein, and/or a combination thereof. The embodiment presented herein is implemented by, for example, hardware, software, firmware, middleware, a microcode, or any combination thereof. The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date structure or a program statement. The code segment, with another code segment or a hardware circuit, transmits/receives information, a data argument, a variable, and memory contents. Thereby, the code segment is connected to the another code segment or the hardware circuit.

REFERENCE SIGNS LIST 1 measurement system
30 base
50 ear-shaped unit
51 ear model
52 artificial ear canal portion
53 artificial ear canal
56 artificial mandible portion
60 vibration detection unit
61x, 61y vibration detection element
70 sound pressure measurement unit
71 microphone
72 tube member
80 holder unit 81 support portion
82 arm
83 movement adjustment portion
100 electronic apparatus
101 housing
102 piezoelectric element
103 panel (vibrator)
110 measurement system
130 head model
131 ear-shaped unit
300 signal analysis unit
410 A/D converter
415 sensitivity adjustment unit
420 frequency characteristic adjustment unit
425 output synthesis unit
430 phase adjustment unit
440 output synthesis unit
450 analysis unit
460 storage unit
470 controller
500 PC
520 display unit

The invention claimed is:

1. A measurement system for evaluating an electronic apparatus that, when a vibrator is pressed against the human ear, delivers a sound based on vibration of the vibrator to a user, the measurement system comprising:
an ear-shaped unit composed of an ear model simulating the human ear and an artificial ear canal portion constituting an artificial ear canal extending from the ear model;
an artificial mandible portion arranged next to the artificial ear canal portion in the ear-shaped unit in a planar view; and
a vibration detection unit disposed on a plane of the artificial mandible portion opposite to the ear model and configured to detect and output vibration delivered to the artificial mandible portion.

2. The measurement system according to claim 1, further comprising a sound pressure measurement unit configured to detect and output a sound pressure of an air conduction component generated by vibration of at least one of the ear model and the artificial ear canal.

3. The measurement system according to claim 1, further comprising a second vibration detection unit configured to detect and output vibration delivered to the auricle, and disposed in a periphery of the artificial ear canal portion in a planar view where the artificial mandible is not located and on a plane opposite to the ear model.

4. The measurement system according to claim 2, comprising a phase adjustment unit configured to relatively adjust a phase of each detected output.

5. The measurement system according to claim 2, further comprising an output synthesis unit configured to synthesize each output.

6. The measurement system according to claim 1, comprising an analysis unit configured to analyze frequency characteristics of a detected output.

7. The measurement system according to claim 5, comprising an analysis unit configured to analyze frequency characteristics of an output of a result of synthesis of each output.

8. The measurement system according to claim 1, further comprising a sensitivity adjustment unit configured to adjust sensitivity of the vibration detection unit.

9. The measurement system according to claim 2, further comprising a sensitivity adjustment unit configured to adjust sensitivity of the sound pressure measurement unit.

10. The measurement system according to claim 3, further comprising a sensitivity adjustment unit configured to adjust sensitivity of the second vibration detection unit.

11. The measurement system according to claim 1, further comprising a display unit configured to display an analysis result.

12. The measurement system according to claim 1, further comprising a human head model, wherein
the ear-shaped unit serves as an artificial ear constituting the head model and is removably attached to the head model.

13. The measurement system according to claim 1, wherein the artificial ear canal of the ear-shaped unit has a length of 26 mm to 40 mm.

14. The measurement system according to claim 1, further comprising a holder unit configured to hold the electronic apparatus.

15. The measurement system according to claim 14, wherein the holder unit may adjust pressing force of the vibrator to the ear-shaped unit within a range of 0 N to 10 N.

16. The measurement system according to claim 1, wherein the ear-shaped unit is made of a material in conformity with IEC60318-7.

17. The measurement system according to claim 1, wherein the sound pressure measurement unit has a microphone supported by a tube member extending from an outer wall of the artificial ear canal.

18. The measurement system according to claim 1, wherein the sound pressure measurement unit has a microphone disposed in a floating manner from an outer wall of the artificial ear canal.

19. A measurement method including:
in order to evaluate an electronic apparatus that, when a vibrator is pressed against the human body, delivers a sound based on vibration of the vibrator to the user,
bringing the vibrator into contact with an ear model of an ear-shaped unit simulating the human ear; and
detecting vibration delivered to an artificial mandible portion arranged next to an artificial ear canal portion in the ear-shaped unit by using a vibration detection unit arranged on a plane intersecting with the artificial ear canal opposite to the ear model.

20. The measurement method according to claim 19, further including measuring a sound pressure of an air conduction component generated by vibration of at least one of the ear model and the artificial ear canal.

* * * * *